Oct. 14, 1969     M. SHOELD     3,472,696
STORAGE BATTERY HAVING SPIRAL ELECTRODES WITH
IMPROVED ACTIVE MATERIAL CARRIER
Filed July 29, 1968
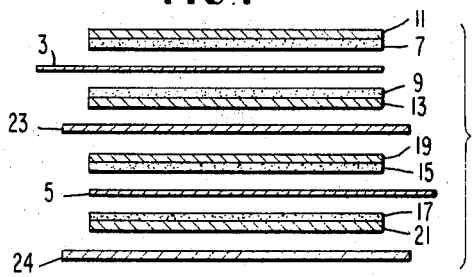
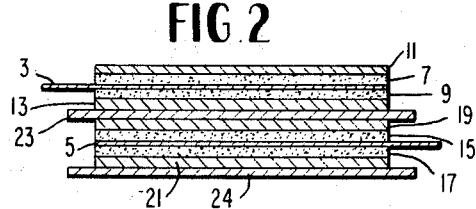
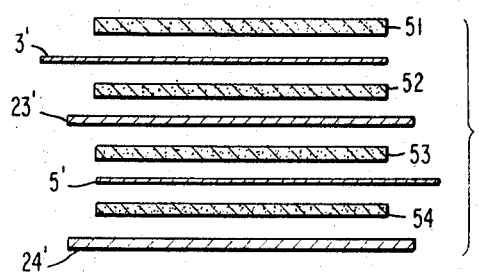
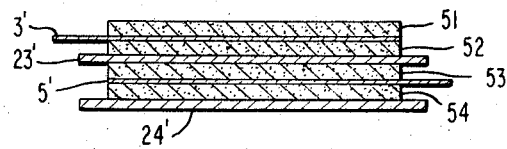
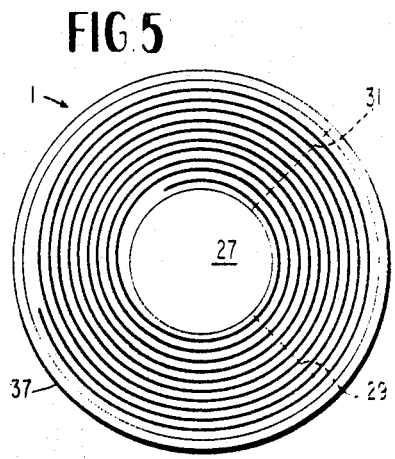
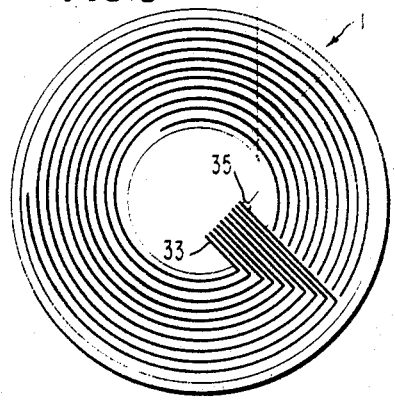
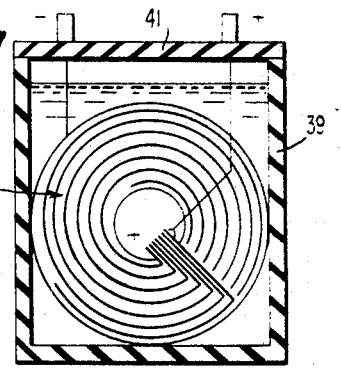
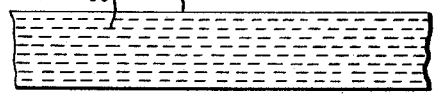
INVENTOR
MARK SHOELD
BY  Young & Thompson
ATTORNEYS

United States Patent Office 3,472,696
Patented Oct. 14, 1969

3,472,696
STORAGE BATTERY HAVING SPIRAL ELECTRODES WITH IMPROVED ACTIVE MATERIAL CARRIER
Mark Shoeld, 2140 E. Graves Ave.,
Orange City, Fla. 32763
Filed July 29, 1968, Ser. No. 748,409
Int. Cl. H01m 35/04, 35/16
U.S. Cl. 136—13                              7 Claims

ABSTRACT OF THE DISCLOSURE

A lead acid storage battery of the jelly-roll type, in which the sandwich that is rolled up comprises a plurality of superposed layers including two lead foils which are the electrodes. Layers of lead peroxide paste, spray coated on and embedded in high wet strength kraft paper or dispersed in and admixed with the pulp forming the paper, are disposed on and in contact with opposite sides of the positive foil; while layers of colloidal lead paste, similarly supported, are disposed on and in contact with opposite sides of the negative foil. There is also at least one sheet paper spacer between the positive and negative assemblies.

---

The present invention relates to storage batteries having spiral electrodes.

In my patent application Ser. No. 637,219, filed May 9, 1967, now Patent No. 3,395,043, and also in my application Ser. No. 669,599, filed Sept. 21, 1967, now Patent No. 3,392,044, I have disclosed an electrode assembly wherein each electrode is formed of a sheet or strip of lead foil, and active material such as colloidal lead or lead peroxide carried by a paper strip is maintained in contact with the lead foil.

In order to retain the colloidal lead or finely divided lead peroxide in contact with the lead foil, means were provided on the edges of the paper strip carrying the active material for preventing the material from being displaced from its position between the paper strip and the lead foil.

In accordance with the present invention, it has been found that an electrode assembly similar to that disclosed in my prior applications mentioned above can be provided without the necessity of employing means on the edges of the paper strips for preventing the active material from being displaced out of position. It is known to apply a metal coating on various materials such as paper, for instance, by atomizing molten metal and directing a spray of the atomized molten metal onto the surface to be coated.

It has been discovered that when using a high-pressure atomizing apparatus for spraying metal on paper strips, for instance, that particles of the metal will not only be applied to the surface of the paper strip but that certain of the particles projected at relatively high velocity will become embedded between the fibers of the paper and will produce an anchoring or adhering of the particles to the paper being coated. In this connection, by spraying colloidal lead in the form of a high velocity atomized jet onto paper, the paper will be coated with the colloidal lead and particles of the lead will embed themselves between the fibers of the paper and securely lock the lead coating to the paper. A paper strip so coated and embedded with lead particles may be used in place of the paper strip carrying the colloidal lead in the electrode assemblies described in my prior applications Ser. Nos. 637,219 and 669,599.

When using paper strips so coated and embedded with particles of colloidal lead, it is not necessary to provide the paper strips with any barrier or other means to prevent the colloidal lead separating from the paper strip. Thus, an electrode assembly consisting of a sheet or strip of lead foil having a paper strip on each side thereof, which paper sheet or strip has been coated with colloidal lead in a manner pointed out hereinbefore, may be easily constructed and will withstand considerable mechanical shock without the colloidal lead becoming separated from its position between the lead foil and the paper carrier.

In addition to forming the negative electrode from a strip of lead foil having paper strips disposed on each surface thereof, prepared as hereinbefore described by spraying colloidal lead onto the paper strips, the present invention also provides for the preparation of positive electrodes by employing strips of paper onto which a slurry of lead peroxide is sprayed at such velocity as to cause particles of the slurry to enter between the fibers of the paper and become embedded therein so as to anchor the coating of lead peroxide onto the paper and make a more stable lead peroxide-coated paper strips than was heretofore possible by depositing a slurry of lead peroxide on a paper strip and bounding the same.

Thus the positve electrode, in accordance with this invention, may be prepared by assembling a paper strip on each surface of a lead foil strip which paper strips have been coated with lead peroxide and has particles of the lead peroxide embedded therein in a manner as herein described.

In addition to forming paper strips having either the negative or positive active material anchored thereto, as hereinbefore described, this invention includes an embodiment wherein the active material is incorporated into the paper strip by treating the pulp or pulp slurry from which the paper is formed with active material so that said active material will be incorporated in and form part of the finished paper strip. A paper strip so constructed with the active material either in the form of colloidal lead or in the form of lead peroxide when brought into contact with the strip of lead foil will form an electrode the active material of which will not disintegrate.

The invention will be described and illustrated in connection with a lead acid battery, as shown in the accompanying drawing, in which:

FIG. 1 is a diagrammatic view of the sandwich of superposed layers of the battery of the present invention, with the layers spaced apart and greatly magnified in thickness for clarity of illustration;

FIG. 2 is a view similar to FIG. 1, but showing the layers in enlarged cross section and in assembled condition;

FIG. 3 is a view similar to FIG. 1 of a modified form of the invention;

FIG. 4 is a view similar to FIG. 2 of the modified form of the invention;

FIG. 5 is a somewhat diagrammatic end view of a storage battery unit of the present invention, at one stage of construction;

FIG. 6 is a view similar to FIG. 5, but showing the completed storage battery unit;

FIG. 7 is a side elevational view, partly in section, showing a completed storage battery assembled according to the present invention; and FIG. 8 is a plan view of a paper or composite strip having longitudinal reinforcing threads therein.

Referring now to the drawing in greater detail, there is shown a storage battery unit indicated generally at 1, and comprising a stack or sandwich of superimposed layers that are rolled up in a spiral. This is sometimes known in this art as "jelly roll" construction. The sandwich comprises a pair of lead foils 3 and 5, one of which is the positive plate and the other of which is the negative plate. On opposite sides of positive foil 3 are disposed layers 7 and 9 of lead peroxides paste ($PBO_2$). The layers 7 and 9 are supported on sheets 11 and 13 of high wet strength paper which may for example be kraft paper.

In accordance with this invention the lead peroxide paste is supported by the paper sheets or strips 11 and 13 and is applied to these sheets or strips by spraying a paste or slurry of the lead peroxide at a high velocity from a nozzle onto one side of the sheet or strip. It is desirable to employ a high velocity spray so that particles of the lead peroxide will at least partially penetrate and become embedded between the fibers of the paper sheet or strip. This will effectively anchor the coating 7 and 9 to the associated paper sheets or strips and make it unnecessary to employ extraneous means to retain the coatings on the paper. Any suitable type of spray nozzle may be employed such as the type in which the paste or slurry of the coating material is atomized and carried by a jet of air or other suitable gas.

On opposite sides of the negative foil 5 are disposed layers 15 and 17 of colloidal or spongy lead paste. This material is the conventional spongy lead paste ordinarily used in batteries of the lead-acid type. The layers 15 and 17 are supported on their sides opposite foil 5 by sheets 19 and 21 of high wet strength paper such as kraft paper. Additional sheets 23 and 24 of high wet strength paper are disposed between the sheets 13 and 19, and on the side of sheet 21 opposite layer 17, respectively.

As in the case of the lead peroxide coatings 7 and 9, the lead coating 15 and 17 is applied to the paper sheets or strips 19 and 21 by spraying as described with respect to coatings 7 and 9.

Preferably, the lead in foils 3 and 5 is about equal in weight to the lead as such in peroxide layers 7 and 9, and also to the colloidal lead in layers 15 and 17.

It is particularly to be noted that the foil 3 extends at one side edgewise beyond the associated sheets 11 and 13. Similarly, the foil 5 extends edgewise beyond the adjacent sheets 19 and 21, but in the direction opposite the foil 3. In this way, structure for the formation of electrical connections of opposite polarity at opposite ends of the completed unit is provided.

The sandwich described above is rolled up in spiral fashion on a central core or mandrel 27 of hard rubber or other plastic. The mandrel 27, however, is of a length not exceeding the length of the sheets 11, 13, 19, 21, 23 and 24, so that the endwise extending edges of the foils 3 and 5 project beyond mandrel 27 in their respective directions. To form the terminals or electrical connections to the unit, these axially overhanging spiral edges of the foils are sliced along the dotted line 29 in FIG. 5, to a depth equal to the axial extent of the overhang. In other words, a radial cut is made through the plural spaced layers of overhanging end of the foil, to a depth down to the end of the mandrel. Then, beginning from a radially inner periphery of the spiral, this cut is extended from its bottom peripherally about at least a portion of the periphery of the mandrel, approximately in the plane of the mandrel end, to the dotted line 31 shown in FIG. 5, so that the end strips are cut from the multiple layers of the foil. These strips 33, however, remain attached to their respective foil layers.

The strips 33 are then bent radially inwardly as shown in FIG. 6 and are secured together as by soldering or clamping or twisting, thereby to form a junction or terminal 35 of the battery unit. The same operation is repeated at the opposite end of the unit to form the terminal of opposite polarity (not shown).

The mandrel either solid or tubular may be of any suitable diameter and is preferably maintained in the roll after completion. If desired, the space within the mandrel may be filled with a suitable foam or other filler.

The completed unit may if desired be encased in a polyethylene or other plastic sleeve 37 or other suitable constricting and confining container.

A plurality of individual units 1 will ordinarily be disposed in series and will of course be wet with a sulfuric acid electrolyte. To this end, as shown in FIG. 7, the units can be encased with their axes horizontal, so as to protect their end or terminal structure, in a casing 39 of hard rubber or plastic or the like having a cover 41. The casing 39 and cover 41 can be of generally conventional construction, and the cover 41 is of course provided with the usual vents (not shown).

To enable those skilled in this art to practice the invention, the following illustrative example is given:

EXAMPLE

Two lead foils are used, each 50 feet long and 12½ inches wide and 0.002 inch thick. Six 50-foot strips of kraft paper of conventional nature, of 0.008 inch thickness each, having a porosity approximately 60% and weighing ¼ ounce/sq. ft. dry, are used. This paper is acidproof and of high wet strength, because rubber latex is used in its manufacture.

On two of the paper strips, on one side only of each, there is applied by spraying a coat of lead peroxide in the form of a paste containing 30% by weight of water, balance lead peroxide, to a thickness of about 0.006 inch. Cn two of the other strips, a coating of about the same water content is deposited by spraying, but of a paste of colloidal lead of conventional nature. The pastes are coated on their respective backings, as hereinbefore described, so as to partially embed and thereby securely anchor the same to the strips.

The sandwich is then assembled as shown in FIGS. 1 and 2 and is wrapped up on a hard rubber or plastic mandrel 12 inches long and 3 inches in diameter. The finished diameter is about 10 inches. The end connections are then formed as shown in FIGS. 5 and 6 and the end strips 33 clamped together so that they are in electrical contact with each other. The completed unit is then wrapped in two or three layers of polyethylene sheet and wide rubber bands are slipped over the polyethylene.

To add the electrolyte, a plurality of the rolls are disposed with their axes horizontal in a lead-lined vacuum tank. A nearly complete vacuum is then produced, and sulfuric acid of 53° Baumé is introduced. The pore spaces of the kraft paper are thus filled; and with the water in the paste, an acid electrolyte of 1.28 specific gravity is achieved, which is desirable for the fully charged battery. On discharge, the acid strength goes down to about 1.20 specific gravity.

Alternatively, the rolls can be disposed as described above, in a lead-lined tank with open top and at atmospheric pressure. Sulfuric acid of 1.28 specific gravity is then introduced slowly at the bottom, and the water in the units is gradually displaced and runs off over the top of the tank in the form of weaker acid. A series of two or three of these tanks can be used so as in effect to produce a stepwise countercurrent operation. The dilute acid is recovered by the addition of oleum or even fuming acid to bring it up to the desired original specific gravity of 1.28.

Including the electrolyte and a proportional part of the casing and cover 39, 41, the per unit weight is about 52 pounds, of which about 36 pounds is lead, divided in three parts: 12 pounds, the total weight of the two lead foils, the lead in the lead peroxide and the lead of the colloidal lead would have a combined weight of 24 pounds.

The unit produces a voltage of about 2.2. Due to the high ratio of active mass to electrode the energy density is greatly in excess of the normal 10 watt-hours per pound for ordinary lead-acid batteries being as high as 50–60 per pound. The reaction on discharge is as follows:

$$PbO_2 + Pb + 2H_2SO_4 \rightarrow 2PbSO_4 + 2H_2O$$

In charging, the reaction goes in the opposite direction.

A modified form of this invention is shown in FIGS. 3 and 4 of the drawing. In this form of the invention the positive electrode is formed of a lead foil 3' and two strips of paper 51 and 52 disposed on each side of the foil 3'.

The paper strips 51 and 52 are impregnated with active positive material, i.e., lead peroxide in a quantity sufficient to make electrical contact with the lead foil 3' when assembled therewith as in FIG. 4.

Similarly, the negative electrode is formed of lead foil 5' and two strips of paper 53 and 54 impregnated with active colloidal lead.

With this construction a battery is provided having the advantages of the construction described in connection with FIGS. 1, 2, 5–7.

In some instances it has been found desirable to incorporate reinforcing threads in the paper strips of the embodiment of FIGS. 1 and 2 to reduce the longitudinal stretch of the paper strips when under tension during rolling up of the electrode assemblies. The threads 55 shown by dotted lines in FIG. 8 extend longitudinally of the strips and are spaced apart transversely of the strips a suitable distance for instance ¼ to 1 inch. In other words, the threads 55 are weftless warp threads. The threads 55 are formed of cotton or other suitable material.

Use of the reinforcing threads 55 is useful in the embodiment of FIGS. 1 and 2 in certain instances to retard any tendency of the active material to separate from the strips.

In the embodiment of FIGS. 3 and 4, the use of threads 55 is particularly important since by embedding the threads 55 in the mass of pulp and active material during manufacture of the strips the strength and resistance to longitudinal stretch is increased. This allows a wider range of active mass to pulp; for instance the volume of active mass to paper pulp plus cotton threads may be from 50% to 90%.

The use of cotton thread lengthwise to prevent stretch, and allow more tension during the rolling up operation may be of considerable importance in any modification of the basic principle of the invention.

The present invention is highly advantageous in that the active material (lead, lead peroxide) is coated and embedded or mixed and embedded in the paper carrier strip and is supported thereby in such a manner that it is retained thereby. It can be said that in either case the active material is at least partially embedded in the paper.

Although the present invention has been described and illustrated in connection with a preferred embodiment, it is of course to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A lead-acid storage battery comprising a first strip of lead foil, a strip of porous insulating paper of high wet strength disposed on each surface of said strip of lead foil, lead dioxide paste carried by and at least partially embedded between the fibers in each strip of insulating paper facing the strip of lead foil and in contact with said lead foil and forming a positive electrode, a second strip of lead foil, a strip of porous insulating paper of high wet strength disposed on each surface of said second strip of lead foil, a paste of lead in colloidal form carried by and at least partially embedded between the fibers in the last-mentioned strips of insulating paper facing the second strip of lead foil and in contact with said second strip of lead foil and forming a negative electrode, said electrodes being rolled up in the form of a spiral, the lead foil of the positive electrode projecting beyond the paste of lead dioxide and insulating paper carrying the same at one end of the spiral, the lead foil of the negative electrode projecting beyond the paste of lead in colloidal form and insulating paper carrying the same at the other end of the spiral, portions of the projecting foil of the positive electrode being in electrical contact with each other and portions of the projecting foil of the negative electrode being in electrical contact with each other and providing terminals for the battery.

2. A battery according to claim 1 wherein the lead dioxide and the colloidal lead are dispersed throughout the paper strips carrying the same.

3. A battery according to claim 1 wherein the paper strips have longitudinally extending weftless reinforcing threads therein spaced apart transversely of the strips.

4. A battery according to claim 2 wherein the paper strips have longitudinally extending weftless reinforcing threads therein spaced apart transversely of the strips.

5. A battery according to claim 1 wherein a strip of porous insulating paper is interposed between the positive and negative electrodes and rolled up with the electrodes.

6. A battery according to claim 2 wherein a strip of porous insulating paper is interposed between the positive and negative electrodes and rolled up with the electrodes.

7. A battery according to claim 3 wherein a strip of porous insulating paper is interposed between the positive and negative electrodes and rolled up with the electrodes.

References Cited

UNITED STATES PATENTS

| | | | |
|---|---|---|---|
| 2,678,343 | 5/1954 | Daniel | 136—26 |
| 2,747,007 | 5/1956 | Brandt | 136—14 |
| 3,011,007 | 11/1961 | Evers et al. | 136—26 |
| 3,310,437 | 3/1967 | Daree et al. | 136—13 |
| 3,395,043 | 7/1968 | Shoeld | 136—13 |
| 3,395,044 | 7/1968 | Shoeld | 136—13 |

FOREIGN PATENTS 791,501   3/1958   Great Britain.

WINSTON A. DOUGLAS, Primary Examiner

C. F. LE FEVOUR, Assistant Examiner

U.S. Cl. X.R.

136—26